United States Patent
Stewart et al.

[19]

[11] Patent Number: 5,930,708
[45] Date of Patent: Jul. 27, 1999

[54] COMMUNICATIONS SATELLITE ROUTER-FORMATTER

[75] Inventors: Michael E. Stewart, Manhattan Beach; Stuart T. Linsky, San Pedro, both of Calif.

[73] Assignee: TRW Inc., Redondo Beach, Calif.

[21] Appl. No.: 08/620,068

[22] Filed: Mar. 21, 1996

[51] Int. Cl.$^6$ .............................. H04Q 7/20; H04Q 7/22; H04Q 7/38; H04Q 7/28

[52] U.S. Cl. .................. 455/428; 455/430; 455/13.1; 455/11.1; 455/426; 455/12.1

[58] Field of Search ................... 455/428, 430, 455/427, 429, 422, 403, 11.1, 13.1, 13.2, 552, 517, 13.3, 432, 12.1, 445, 15, 16, 446, 456, 561; 370/316, 315, 426

[56] References Cited

U.S. PATENT DOCUMENTS

| | | |
|---|---|---|
| 3,564,147 | 2/1971 | Puente et al. . |
| 3,629,511 | 12/1971 | Wolf . |
| 3,818,453 | 6/1974 | Schmidt et al. . |
| 3,842,350 | 10/1974 | Gross ...................................... 455/13.1 |
| 4,583,218 | 4/1986 | Ardon et al. . |
| 4,759,016 | 7/1988 | Otsuka . |
| 4,876,681 | 10/1989 | Hagiwara et al. . |
| 5,081,703 | 1/1992 | Lee ......................................... 455/13.1 |
| 5,173,933 | 12/1992 | Jabs et al. . |
| 5,339,356 | 8/1994 | Ishii . |
| 5,412,660 | 5/1995 | Chen et al. . |
| 5,442,689 | 8/1995 | Buttitta et al. . |
| 5,450,395 | 9/1995 | Hostetter et al. . |
| 5,559,806 | 9/1996 | Kurby et al. ............................. 455/428 |
| 5,655,005 | 8/1997 | Wiedeman et al. ..................... 455/13.1 |
| 5,666,661 | 9/1997 | Grube et al. ............................ 455/517 |

OTHER PUBLICATIONS

"System Organization for General Communication Via Medium Altitude Satellites," D.G.C. Luck, *RCA Review*, Sep. 1963, pp. 293–324.

*Primary Examiner*—Wellington Chin
*Assistant Examiner*—Keith Ferguson
*Attorney, Agent, or Firm*—Michael S. Yatskc

[57] ABSTRACT

A local telecommunications network is provided for satellite based telecommunications. The network 10 includes multiple handsets 18–22, 50 and 54 which communicate directly with ground stations 14 and 16. The ground stations communicate with an overhead satellite 12 through a satellite telecommunications uplink. The ground stations include a router for determining whether outgoing calls are directed to a destination handset located within or outside a predefined local geographic cell 30 and 32 for the corresponding ground station 14 and 16. If the destination handset is located outside the local cell of the originating handset, the ground station passes the call to the overhead satellite 12 to establish a satellite telecommunications link. However, if the destination handset 50 is located within the same local cell 32 as the originating handset 22, then the router 16 establishes a direct link between the handsets 22 and 50 without establishing a satellite telecommunications link 26.

21 Claims, 2 Drawing Sheets

COMMUNICATIONS SATELLITE ROUTER-FORMATTER

FIELD OF THE INVENTION

The present invention generally relates to a satellite based telecommunications system. More specifically, the invention relates to a telecommunications satellite system containing a device, such as a local ground station, which serves as a router-formatter for communications between the satellite and local handsets.

BACKGROUND OF THE INVENTION

With the advent of modern telecommunications technology, telecommunications services are being offered in more and more remote regions of the world. Telecommunications services have been offered to these remote areas in a variety of ways. For instance, several satellite based systems have been proposed to enable direct communication between handsets and the satellite even when the mobile station is located in a region of the world far removed from wire-based or cellular telephone services. As proposed, the foregoing satellite systems include individual user handsets which afford bidirectional communication directly with the telecommunications satellite. The handsets do not communicate directly with any other handset. The term "handset" as used throughout includes mobile stations, portable phones, cellular phones, wire-based stationary phones, faxes, modems and the like.

However, the current handset-to-satellite link is considered to have certain limitations, particularly with respect to signal blockage. In order to effect direct communication between the handset and satellite, the communications link requires an unobstructed line of sight therebetween or an "open sky" void of obstructions, such as buildings, trees and the like. Such intervening structures interfere with the communications link. To minimize the risk of obstructions between the satellite and handset, the handsets should be used in open areas away from large buildings. Alternatively, the handsets may be attached to stationary antennas, such as a rooftop omni or dish-type antenna. However, such connections greatly constrain the portability of the handsets, thereby rendering the handset a stationary unit. Stationary units may have limited use, such as in regions which do not have existing telephone infrastructures or in areas where the existing telephone system is prohibitively expensive and/or unreliable. However, a telephone system consisting of stationary units would be less economical and require more satellite links than the proposed invention.

Moreover, notwithstanding the use of stationary roof mounted antennas, the stationary units heretofore proposed still experience limitations, due to the use of an asynchronous communications uplink. More specifically, the telecommunications satellite systems thus far proposed contemplate using a synchronous down link when the satellite transmits data to the mobile station. However, each satellite must receive uplink communications data from a large number of individual mobile stations. Some proposed systems (Irridium and Global Star) contemplate using asynchronous uplinks. Another proposed system (Odyssey, proposed by the assignee of the present application) contemplates using synchronous uplinks. The concept of synchronous and non-synchronous communications are explained in more detail in the book entitled "Satellite Communications Systems" by Maral et al., published by John Wiley & Sons, New York, N.Y. (1986), and in the book entitled "An Introduction to GSM" by Redl et al., published by Artech House Publishers, Boston, Mass. (1995). Both of the above-referenced books are expressly incorporated by reference in their entirety. Synchronous communications are achieved based on timing information provided to all mobile stations. The timing information is provided separately to each mobile station. The timing information controls advancements and retardation of the time at which a mobile station begins transmission to ensure that the data is received synchronously from all transmitting mobile stations. Timing information is generally used in connection with synchronous return links from mobile stations.

When using non-synchronous uplinks, the system greatly limits the capacity of the uplink as compared to a synchronous uplink. Non-synchronous direct sequence spread spectrum communications links experience substantially greater co-channel interference as compared to synchronous links. To minimize the co-channel interference, the system typically employs substantial forward error correction encoding and limits the number of mobile stations supported by the satellite, thereby decreasing the system's capacity and economical viability. When using synchronous uplinks, the proposed systems (Odyssey) require complex circuitry to be installed in each mobile station to control timing advancements and retardations and individual handset output power. This synchronization and power control circuitry increases the complexity and cost of each handset.

In addition, portable handsets have a limited battery dependent power supply, thereby limiting the maximum achievable output power level and duration of portable service. Satellite based telecommunications systems, such as the Odyssey system, contemplate using low power generally omni-directional antennas with the mobile stations. Such omni-directional antennas transmit outgoing communications typically with more or less the same power in all directions. These omni-directional or hemisphere coverage antennas may operate at power levels as low as one-half watt. These power constraints further render the communications link with the handset susceptible to line of sight obstructions between the handset and satellite.

Moreover, the proposed satellite based telecommunications systems require unduly excessive communications traffic with the satellite. Generally, communications links in satellite based systems may be categorized into (1) local calls between two local handsets located within a relatively small geographic area, and (2) long distance calls between one local handset and a remote destination handset. The terms "local" and "remote" as used throughout this application are used relative to a predefined geographic area or cell surrounding the handset initiating the call. If the destination handset falls within this geographic area, the call is deemed local. Otherwise, the call is deemed remote or long distance.

The proposed satellite based systems route all outgoing calls from an initiating handset through a corresponding satellite located overhead the initiating handset. The satellite then transmits each call to a network ground or earth station which decodes the call destination. If the destination is also a PCS satellite handset, it determines which satellite and ground station connections are necessary to direct the call to the destination handset. The network ground station is connected to a PSTN network. If the destination handset is also local, the network ground station transmits the signal back to the overhead satellite above the predefined geographic area surrounding the initiating handset. The satellite transmits the call to the destination handset. If the destination handset is remote, the network ground station may transmit the call via wireline network and a ground station and/or satellite. Thus, all calls must be routed through the overhead satellite and network ground station, regardless of whether the destination handset is local or remote. Such routing unnecessarily increases the traffic which must be supported by the satellite and network ground stations.

Conventional systems have failed to address the deficiencies noted above within the field of satellite based telecommunications. Examples of existing systems are disclosed in U.S. Pat. No. 5,173,933 and U.S. Pat. No. 5,412,660 both of which are expressly incorporated by reference in their entirety.

The '660 patent discloses a satellite based ISDN network. The network includes a plurality of portable satellite terminals which receive and transmit communications which conform to the ISDN industry standard and which operate with standard ISDN equipment. The network of the '660 patent extends the public service telephone network (PSTN) access to isolated single terminals. However, the '660 patent is not concerned with extending PSTN access to a remote community with multiple users therein, and hence is not concerned with providing remote intra-community communications paths without accessing overhead satellites. Instead, the system of the '660 patent transmits all ISDN data via the satellite without distinguishing between remote and local destinations.

The '933 patent discloses an interface between mobile telecommunications stations and trunk channels linked to various communications carriers, such as a satellite dish, a cellular line antenna and the like. The interface automatically selects the most cost-effective carrier upon which to transmit an outgoing telephone or fax transmission from a mobile station. However, the interface of the '933 patent does not distinguish between local and remote destinations. Nor does the interface of the '933 patent bypass the satellite or antenna for entirely local calls. Instead, the interface of the '933 patent is intended solely for remote calls, namely calls which must be relayed through a satellite or similar communications carrier. The '933 patent is intended for implementation upon an oceangoing vessel and is intended to provide a communications link between callers on the vessel and parties on shore. The communications system of the '933 patent is not concerned with intra-ship communications. Thus, the interface of the '933 patent does not provide a local community with a low cost telecommunications infrastructure.

A need remains for an improved satellite based telecommunications system for use in a remote community that can economically interface with or provide the basis for a wired or wireless/cellular-type telecommunications infrastructure. It is an object of the present invention to meet this need.

SUMMARY OF THE INVENTION

It is an object of the present invention to provide a telecommunications satellite based system containing a base station which controls routing and formatting of communications between an overhead satellite and local handsets to provide an economic communications infrastructure for a remote community.

It is another object of the present invention to provide a routing module which reduces the communications traffic to and from the satellites in order to increase the system's overall capacity by judicious use of satellite resources.

It is a corollary object of the present invention to minimize uplink communications traffic by distinguishing between local and remote destinations for outgoing calls and redirecting, within the base station, local calls to the local destination without use of the satellite.

It is yet another object of the present invention to provide a router/formatter which may enhance communications uplinks by utilizing a high-power steerable beam or phased array type antenna.

It is a corollary object of the present invention to provide a wireless telecommunications infrastructure for a remote community capable of utilizing handsets, such as portable or cellular phones which operate according to a conventional standard.

It is yet a further object of the present invention to utilize economic handsets which are greatly reduced in complexity and need not rely on line of sight communications or maintain synchronous communications links with a satellite.

It is a further object of the present invention to provide a router/formatter module which maintains consistent line of sight access with the satellite.

It is a further corollary object of the present invention to provide a formatter/router module which affords an easy and economical centralized device that may maintain synchronous uplink and downlink communications with a corresponding overhead satellite to minimize co-channel interference and maximize system capacity.

It is yet a further object of the invention to provide a router/formatter module which enables the use of dual use handsets capable of communicating directly with a satellite over a line of sight satellite communications link or with the router/formatter over an RF cellular link.

It is another object of the present invention to provide router/formatters capable of communicating directly with one another if located close enough to avoid a satellite link therebetween.

The above and other objects are achieved by the present invention which provides, in the preferred embodiment, a local telecommunications network for satellite based telecommunications. The network 10 includes multiple handsets 18–22, 50 and 54 which communicate directly with local ground stations 14 and 16. The local ground stations communicate with an overhead satellite 12 through a satellite telecommunications uplink. The satellite in turn communicates with a network ground station 41 to redirect the call to a secondary satellite and/or secondary local ground station. The local ground stations include routers for determining whether outgoing calls are directed to a destination handset located within or outside a predefined local geographic cell 30 and 32 for the corresponding local ground station 14 and 16. If the destination handset is located outside the local cell of the originating handset, the local ground station passes the call to the overhead satellite 12 and network ground station 41 to establish a satellite telecommunications link with a remote destination. However, if the destination handset 50 is located within the same local cell 32 as the originating handset 22, then the router establishes a link between the handsets 22 and 50 via the router-formatter 16 without establishing a satellite telecommunications link 26.

DETAILED DESCRIPTION OF THE PREFERRED EMBODIMENT

Figure 1:
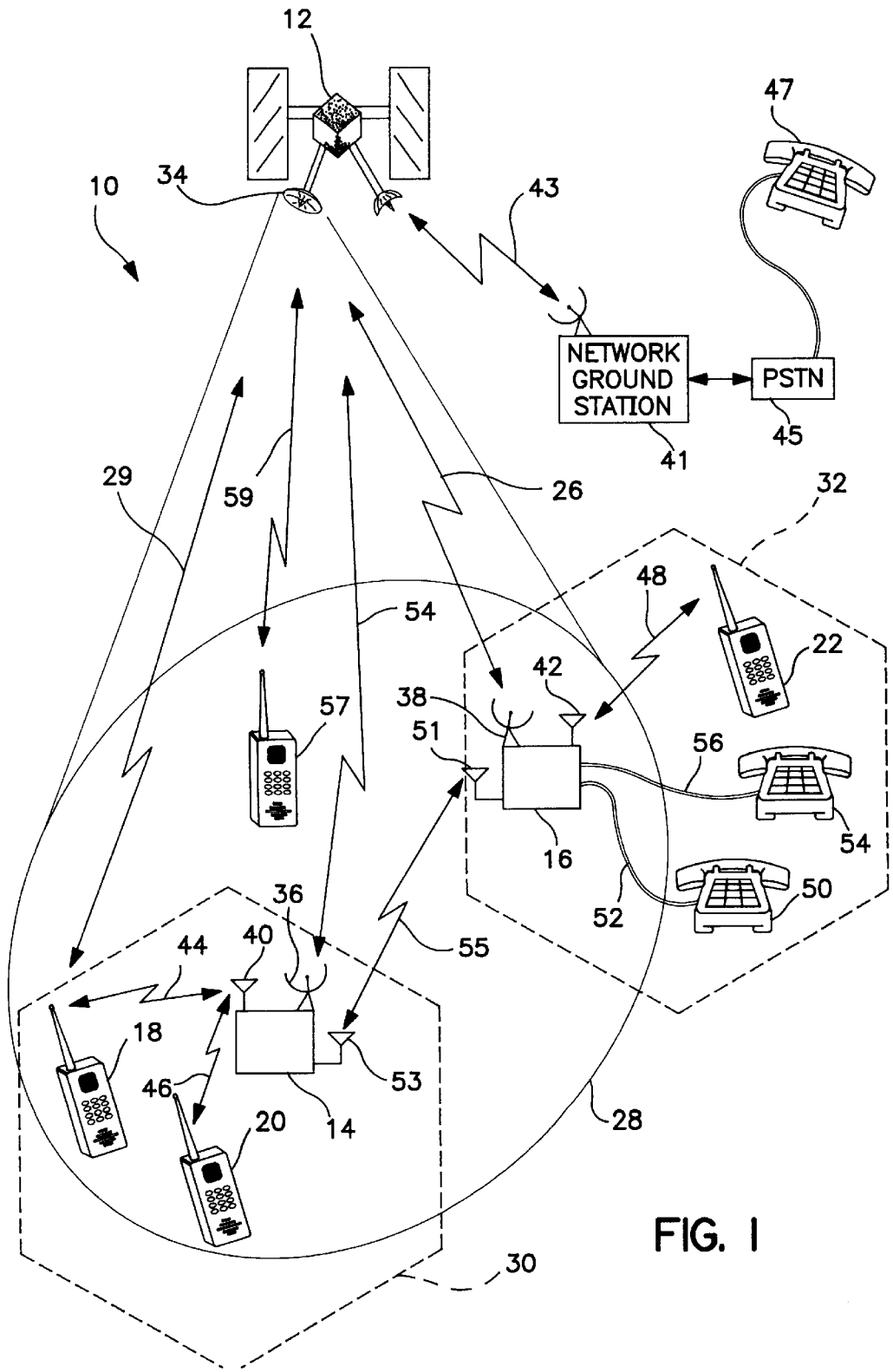
FIG. 1 illustrates a satellite based telecommunications system in block diagram form.

FIG. 1 generally illustrates a satellite based telecommunications system 10. The system 10 includes a satellite 12 which communicates with local ground stations 14 and 16 located within the coverage area 28 afforded by antenna 34 of the satellite 12. The terms "ground" and "base" stations are used interchangeably throughout the application. The local ground station 14 directly communicates with mobile stations 18 and 20 located within the predefined cell 30 surrounding the ground station 14. The cell 30 (denoted in dashed lines) may be of any desired predefined geographic shape. Optionally, the cell 30 may correspond to the maximum distance to which the ground station 14 is capable of transmitting. Local ground station 16 similarly communicates with mobile stations 22 located in the corresponding predefined cell 32. The local ground station 16 may also communicate with conventional telephones 50 and 54, which are connected to the local ground station 16 via local telephone line links 52 and 56.

The local ground stations 14 and 16 communicate via communications links 24 and 26, respectively, with the satellite 12. The communications links 24 and 26 represent bidirectional links for uplink and downlink communications. The local ground stations 14 and 16 include antennas 36 and 38, respectively, which maintain the communications links 24 and 26. The antennas 36 and 38 may represent "smart" or steerable antennas which may be capable of tracking the satellite 12. The antennas 36 and 38 may include phased arrays which may be capable of forming multiple steerable transmission beams adjusted to follow the orbital motion of the satellite 12. The antennas 36 and 38 may be configured to transmit at significantly higher power levels and employing a smaller beamwidth than those levels and beamwidths associated with conventional portable handsets used to directly communicate with telecommunications satellites. For instance, conventional portable handsets may utilize omni-directional antennas which operate at one-half watt of power. The antennas 36 and 38 may operate at significantly higher power levels, such as an order of magnitude or more greater than that used with omni-directional antennas in portable handsets.

In addition, the antennas 36 and 38 may be of any desired size (i.e. not limited to man-portable form factors). Preferably, the antennas 36 and 38 are positioned to afford an unobstructed line of sight with the satellite 12 throughout the satellite's overhead orbit (such as upon a rooftop building, in an open field, and the like). Optionally, by increasing the power level and size of the antennas 36 and 38 as compared with omni-directional antennas utilized with portable handsets, the local ground stations 14 and 16 are able to maintain the communications links 24 and 26 with high integrity and alleviate transmit power requirements on the satellite 12. Positioning the antennas 36 and 38 in an unobstructed area further assures fidelity of the communications links 24 and 26.

The local ground stations 14 and 16 include separate RF antennas 40 and 42 for communicating with the mobile stations 18–22. The RF antenna 40 maintains RF cellular links 44 and 46 with mobile stations 18 and 20, respectively. The RF antenna 42 maintains an RF cellular link 48 with mobile station 22.

The RF antennas 40 and 42 maintain the RF communications links 44–48 according to any conventional portable or cellular phone standard, such as the standard used in any of the following systems; namely, the GSM system, the IS-95 system, the DECT system CT2, CT2+, AMPS, N-TDMA (IS-54), and the like. Hence, the mobile stations 18–22 need not maintain an unobstructed line of sight with the RF antennas 40 and 42.

The satellite 12 communicates with a network ground station 41 through a satellite link 43. The network ground station 41 may communicate with a PSTN 45 and remote telephones 47 that are connected to the PSTN 45. The satellite 12 relays all received calls to the network ground station 41 which determines a destination for the call. The network ground station 41 may direct the call to the PSTN 45, a second satellite or a second local or network ground station based on the call destination. Thus, a call may travel from handset 22 to local ground station 16, to satellite 12, to network ground station 41. The call may then be passed back to satellite 12, directly to hand set 57, or to PSTN 45 or to local ground station 14.

Optionally the mobile stations may include an RF antenna and an omnidirectional satellite antenna and have dual operating modes. In a first mode, the mobile stations may communicate via RF links with corresponding local ground stations (as explained above). In a second mode, the mobile stations may communicate through the omni-directional antennas over a satellite communications link 29 directly with the satellite.

Optionally, the local ground stations may include third antennas 51 and 53 capable of directly communicating with one another over communications link 55. The local ground stations may communicate with any other local ground station located within a predefined geographic range and pass calls therebetween without use of the satellite.

The satellites may communicate directly with mobile stations, such as handset 57 via communications link 59 or handset 18 via communications link 29.

Figure 2:
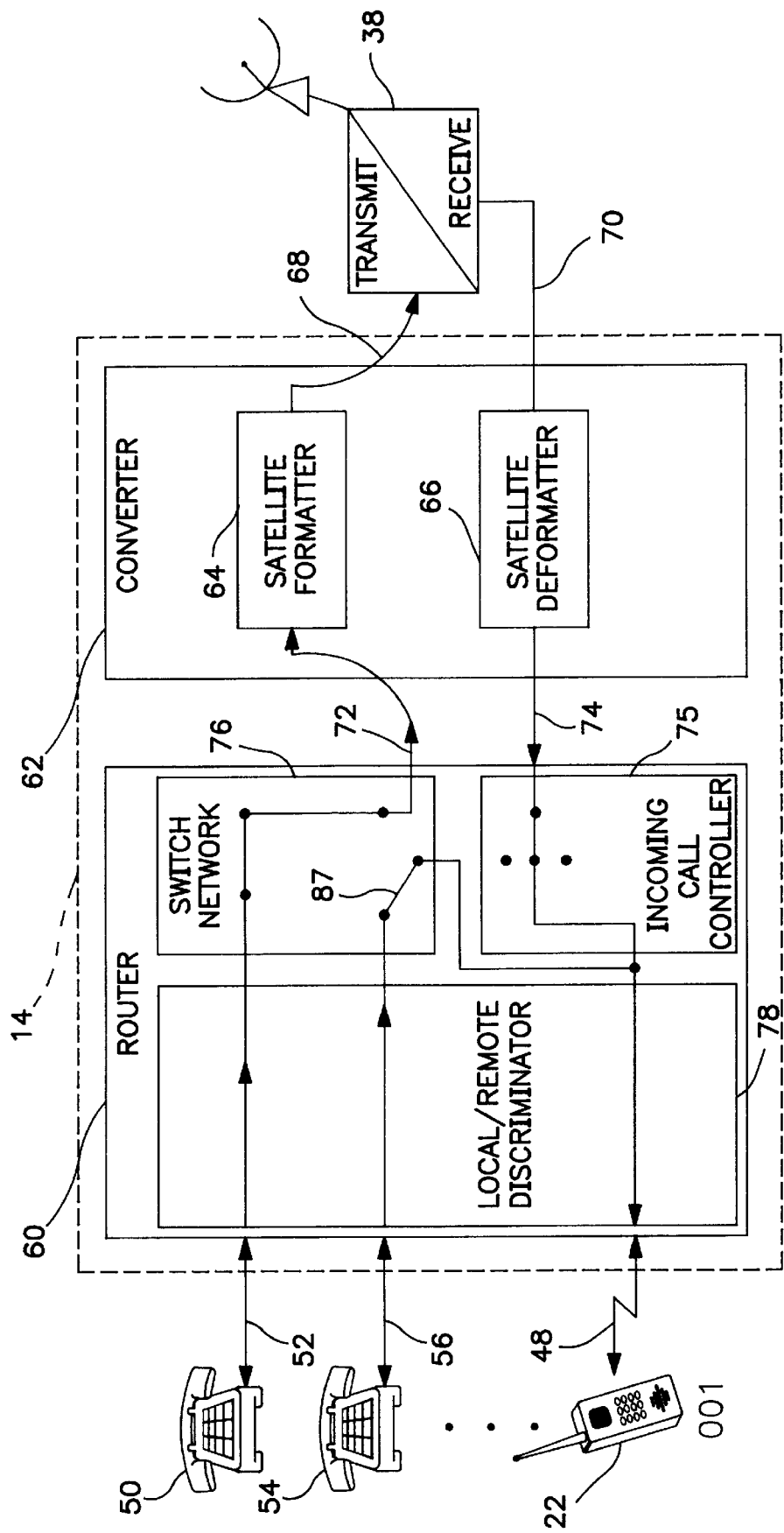
FIG. 2 illustrates, in block diagram form, a router/formatter module according to the present invention.

FIG. 2 illustrates a ground station 16 in more detail. The ground station 16 includes a router 60, a converter 62, and an antenna 38. The converter 62 includes a formatter 64 and a deformatter 66. The formatter 64 receives outgoing telecommunications calls on outgoing satellite line 72. The outgoing calls are formatted according to a local formatting standard which may be any of several conventional standards utilized in connection with portable and cellular phones, such as the standards used in the GSM system, IS-95 system, DECT system and the like. The formatter 64 converts the outgoing call to one of the formats corresponding to a conventional satellite telecommunications standard, such as that proposed in the Odyssey Irridium or GlobalStar systems. Optionally, the formatter 64 may process calls from multiple handsets and transmit the corresponding collective data stream in a synchronous manner with respect to time.

When the converter 62 effects synchronous operation, the formatter 64 may include a plurality of buffers, each of which separately receives outgoing call data from a corresponding local initiating handset. The locally initiated calls generally occur asynchronously. The buffers in the formatter store the asynchronous outgoing call data. The stored call data is then combined, such as in a multiplexor and the like. The combined call data is transmitted synchronously after being time shifted (advanced or retarded) in the formatter 64. Once the formatter 64 completes the conversion of the outgoing signal, it transmits same along the uplink feed line 68 to the antenna 38. The antenna 38 transmits the outgoing call in a transmission beam to the satellite. When the converter 62 operates asynchronously, the buffers and additional circuitry for timing alignment may not be necessary.

The deformatter 66 receives incoming calls from the antenna 38 via down link receive line 70. The deformatter 66 converts the incoming calls to the local format and transmits these calls along the incoming local call line 74 to an incoming call controller 75. The incoming calls on line 74 are directed, via the controller 75, to the designated destination handset (handset 22 in the example of FIG. 2). The controller 75 may operate based on a satellite subscription method, whereby each mobile station has a unique satellite subscription ID. According to this subscription method, the controller 75 may include a database of local caller subscription IDs and their corresponding satellite IDs. (For Odyssey or GSM based systems, this is the temporary mobile station ID (TMSI)). When an incoming call is received, the controller obtains the TMSI for the destination handset from the call. The controller 75 may then use the TMSI as a local caller ID, or alternatively, obtain a separate corresponding local caller ID. The controller 75 then connects the incoming line 74 with the destination handset.

Alternately, the controller 75 may operate based on any of several conventions, including Direct Inward Dialing (DID), Direct Inward System Access (DISA), and the like. The controller 75 may also use an operator who manually routes incoming calls from a satellite to a local handset. DID gives outside callers the ability to call directly to a local handset with an extension number within the local cell. To do this, the outside caller would dial the handset code and a four-digit number, which would be the same as the person's local phone. The DID-type controller will require coordination with the network ground station. The network ground station must recognize the number as belonging to a router-formatter group. It then selects a temporary mobile satellite identifier TMSI that is assigned to the router-formatter group and is currently not in use. It then forwards the local caller subscription ID for the destination handset once the router-formatter has seized the call.

Direct inward system access (DISA) requires the network ground station to recognize the dialed number as belonging to a router-formatter group. It then selects a TMSI that is assigned to the router-formatter group that is currently not in use. Once the router-formatter has seized the call, the initialing handset will be prompted for the destination local caller ID.

With respect to outgoing calls, the router 60 functions to establish a direct local link 86 between first and second local handsets (for instance 54 and 22) without establishing a satellite based remote link when the initiating and destination handsets 54 and 22 are both within the local cell corresponding to the ground station. However, when an initiating handset (50) designates a destination handset which is remote from the local cell, the router 60 establishes a satellite based remote link, via antenna 38, with the satellite and transmits the outgoing call from the local handset 50 to a remote destination handset (not shown in FIG. 2). The satellite based remote link refers to the communications link 26.

To effect routing, the router 60 includes a discriminator 78 and a switching network 76. The discriminator 78 is connected to all incoming lines from the local handsets. These incoming lines may represent hard wired lines 52 and 56. Alternatively, or in addition, the incoming lines may represent an RF cellular link 48 established between an RF antenna 42 and a remote handset 22. Upon receiving an incoming call from a handset, the discriminator 78 analyzes the call to determine whether the destination handset represents a local handset within the local cell 32 or represents a remote handset outside of the local cell 32. The discriminator 78 controls the switching network 76 based upon this determination. The user may dial "9" to inform the discriminator that an outside line is desired. Alternatively, the discriminator may include software to evaluate the number dialed. By way of example, when a handset 54 initiates a call directed to a local destination handset 22, the discriminator 78 controls the switching network 76 to establish a direct link 86 between the initiating and destination handsets 54 and 22 via switch 87. Alternatively, when the initiating handset 50 designates a remote destination handset, the discriminator 78 identifies the call as such and controls a switching network 76 to establish a satellite based remote link between the initiating handset 50 and the satellite 12 via lines 72 and 68, the antenna 38 and communications link 26 (FIG. 1).

The outgoing call is processed in a manner consistent with the selected incoming call embodiment. Namely, if all router-formatter handsets are satellite system subscribers, their specific subscription ID is used to enact satellite communication. If the DID or DISA method is used, wherein the router-formatter has fewer satellite subscriptions than total users, a subscription ID is assigned to the outgoing call based on availability.

According to the foregoing, the preferred embodiment is able to minimize traffic upon the satellite telecommunications links 24 and 26 by omitting therefrom calls strictly of a local nature. The preferred embodiment further enables the use of mobile stations 18–22 which communicate with a local ground station via RF cellular links, which are not limited to line of sight communications. In addition, the ground station 14 may use a high powered directional antenna 38, such as a phased array, which would enable tracking of an overhead satellite and maintain a communications link therewith of substantially better quality than achievable by mobile portable handsets which communicate directly with the satellite. The use of a common antenna 38 for multiple channels may be used to gain the advantages of synchronizing the return link especially using orthogonal CDMA codes to minimize co-channel interference and thereby increasing the capacity of the communications link.

While particular elements, embodiments and applications of the present invention have been shown and described, it will be understood, of course, that the invention is not limited thereto since modifications may be made by those skilled in the art, particularly in light of the foregoing teachings. It is, therefore, contemplated by the appended claims to cover such modifications as incorporate those features which come within the spirit and scope of the invention.

We claim:

1. A local telecommunications network for use in satellite based telecommunications, said network comprising:

first and second handsets for receiving and transmitting telecommunications signals, at least said first handset being located geographically in a predefined local cell; and a ground station, in said local cell, for controlling communications between said first and second handsets, said ground station relaying telecommunications signals between said first and second handsets through one of a direct link and a satellite based remote link, said ground station including:

a router for establishing said direct link between said first and second handsets, without establishing said satellite based remote link, when said first and second handsets are both located within said local cell, said router establishing said satellite based remote link between said first and second handsets when said second handset is located outside, and remote to, said local cell.

2. A local telecommunications network, according to claim 1, wherein said router includes a discriminator which receives outgoing calls initiated by said first handset, said discriminator determining whether said outgoing calls are directed to a destination handset inside or outside of said local cell, said router establishing one of said direct link and satellite based remote link based on said determination by said discriminator.

3. A local telecommunications network, according to claim 1, wherein said router includes a switching network for connecting said first and second handsets through said direct link when said second handset represents a destination handset and when said second handset is located in said local cell.

4. A local telecommunications network, according to claim 1, wherein said ground station further includes a formatter for converting an outgoing call from said first handset from a local format to a satellite telecommunications standard format, said formatter outputting said outgoing call in a synchronized manner with respect to time.

5. A local telecommunications network, according to claim 1, wherein said ground station further includes a deformatter for converting an incoming call to said first handset from a satellite telecommunications standard format to a local format.

6. A local telecommunications network, according to claim 1, wherein said ground station includes a transmitter for transmitting outgoing calls synchronously with respect to time.

7. A local telecommunications network, according to claim 1, wherein at least one of said first and second handsets communicates with said ground station through an RF cellular link.

8. A local telecommunications network, according to claim 1, wherein at least one of said first and second handsets communicate with said ground station through a hard wired telephone line.

9. A local telecommunications network, according to claim 1, wherein said ground station further comprises an antenna for outputting a steerable transmission beam directed toward an overhead satellite to establish said satellite based remote link for carrying telecommunications from said first handset to a remote destination handset.

10. A local telecommunications network, according to claim 1, wherein said ground station further comprises a phased array antenna for maintaining said satellite based remote link with an overhead satellite for carrying said telecommunications signals to and from said local handset when said local handset communicates with a remote handset.

11. A local telecommunications network, according to claim 1, further comprising first and second ground stations which communicate with one another through said satellite based remote link and further comprising a third handset located in a second predefined geographic local cell surrounding said second ground station, said first and third handsets communicating through a said satellite based remote link between said first and second ground stations through an overhead satellite.

12. A local telecommunications network, according to claim 1, wherein said ground station further includes a formatter for converting an outgoing call from said first handset from a local format to a satellite telecommunications standard format, said formatter outputting said outgoing call in an asynchronized manner with respect to time.

13. A ground station for use in satellite based telecommunications between two handsets, at least one of said handsets being a local handset located in a predefined geographic local cell surrounding said ground station, said ground station comprising:

local communications links for outputting and receiving calls to and from local handsets;

a discriminator, connected to said local communications links, for determining whether calls from a local initiating handset are directed to a destination handset which is located in said local cell;

a router, including said discriminator, for directly connecting local initiating and local destination handsets through a direct link through said router when said discriminator determines that said destination handset is located in said local cell; and an antenna for establishing a satellite communications link between said ground station and an overhead satellite, said router connecting said local initiating handset to said antenna when said discriminator determines that said destination handset is remote from said local cell.

14. A ground station, according to claim 13, wherein said router comprises a switching network for connecting said local initiating handset to a local destination handset through said direct link when said discriminator determines that said destination handset is local.

15. A ground station, according to claim 13, further comprising a formatter for converting an outgoing call from said local initiating handset from a first format to a satellite telecommunications standard format, said formatter outputting said call in a synchronized manner with respect to time.

16. A ground station, according to claim 13, further comprising a deformatter for converting an incoming call to a destination local handset from a satellite telecommunications standard format to a local format.

17. A ground station, according to claim 13, further comprising a transmitter for transmitting outgoing calls synchronously with respect to time.

18. A ground station, according to claim 13, further comprising an RF antenna for maintaining an RF cellular communications link with at least one local handset.

19. A ground station, according to claim 13, further comprising wired telephone lines for establishing a telephone link with at least one local handset.

20. A ground station, according to claim 13, wherein said antenna outputs a steerable satellite telecommunications beam adjustable to track an overhead satellite.

21. A ground station, according to claim 13, wherein said antenna constitutes a phased array antenna for outputting a satellite telecommunications beam for transmitting communications data to an overhead satellite.

* * * * *